United States Patent [19]

Klietsch et al.

[11] Patent Number: 4,478,957
[45] Date of Patent: Oct. 23, 1984

[54] PROCESS FOR THE PRODUCTION OF HIGHLY RESILIENT, COLD-CURING POLYURETHANE FOAMS

[75] Inventors: Bernd-Juergen Klietsch, Gelsenkirchen-Buer; Hans-Joachim Kollmeier, Essen; Helmut Lammerting, Herbede; Rolf-Dieter Langenhagen, Hattingen Niederwenigern, all of Fed. Rep. of Germany

[73] Assignee: Th. Goldschmidt AG, Essen, Fed. Rep. of Germany

[21] Appl. No.: 532,579

[22] Filed: Sep. 15, 1983

[30] Foreign Application Priority Data

Sep. 17, 1982 [DE] Fed. Rep. of Germany ....... 3234462

[51] Int. Cl.$^3$ ..................... C08G 18/14; C08G 18/72; C08G 18/32; C08G 18/48
[52] U.S. Cl. ..................................... 521/112; 521/904
[58] Field of Search ................................ 521/112, 904

[56] References Cited

U.S. PATENT DOCUMENTS

| | | |
|---|---|---|
| 3,530,159 | 9/1970 | Guinet et al. ........................ 521/112 |
| 3,564,037 | 2/1971 | Delaval et al. ...................... 521/112 |
| 3,600,418 | 8/1971 | Bailey et al. ........................ 521/112 |
| 3,629,165 | 12/1971 | Holdstock ........................... 521/112 |
| 3,741,917 | 6/1973 | Morehouse ........................... 521/904 |
| 3,957,843 | 5/1976 | Bennett .............................. 521/112 |
| 4,071,483 | 1/1978 | Litteral et al. ..................... 521/112 |
| 4,090,987 | 5/1978 | Koerner et al. ...................... 521/112 |
| 4,119,582 | 10/1978 | Matsubara et al. ................... 521/904 |
| 4,276,385 | 6/1981 | Tenhagen et al. .................... 521/112 |
| 4,309,508 | 1/1982 | Baskeut et al. ...................... 521/112 |

Primary Examiner—Herbert S. Cockeram
Attorney, Agent, or Firm—Toren, McGeady and Stanger

[57] ABSTRACT

The invention relates to a process for the manufacture of highly resilient, cold-curing polyurethane foams with the distinctive feature that polysiloxane-polyoxyalkylene block copolymers with the following characteristics are used as foam stabilizers:

(a) the polysiloxane block is linear or branched and contains an average of 4 to 25 silicon atoms, wherein the organic radicals linked to the silicon atoms are polyoxyalkylene or methyl radicals and up to 30% of the methyl radicals can be replaced by substituted alkyl radicals with 1 to 4 carbon atoms, and/or phenyl radicals, and mixtures thereof;

(b) the polyoxyalkylene portion consists of at least two polyoxyalkylene blocks, $A_1$ and $A_2$, which are formed from oxyethylene and oxypropylene units, wherein block $A_1$ is formed from 45 to 100 mole percent of oxyethylene units and 55 to 0 mole percent of oxypropylene units and block $A_2$ is formed from 0 to 50 mole percent of oxyethylene units and 100 to 50 mole percent of oxypropylene units, the molecular weight of the polyoxyalkylene blocks $A_1$ and $A_2$ in each case being 150 to 1,200 and the molar ratio of blocks $A_1:A_2$ falling in the range of 20:80 to 80:20; and (c) the polysiloxane block is linked to the polyoxyalkylene blocks by SiOC or SiC bridges, 1.5 to 10 polyoxyalkylene blocks being linked to each polysiloxane block on the average.

The stabilizers have improved stabilizing properties and form open-cell foams at a relatively wide processing latitude.

16 Claims, No Drawings

PROCESS FOR THE PRODUCTION OF HIGHLY RESILIENT, COLD-CURING POLYURETHANE FOAMS

BACKGROUND OF THE INVENTION

1. Field of the Invention

The invention relates to a process for the production of highly resilient, cold-curing polyurethane foams. In particular, it relates to foams formed from at least difunctional polyisocyanates, polyols with at least two hydroxyl groups per molecule of which at least 40% on the average are primary hydroxyl groups, the polyols having an equivalent weight per hydroxyl groups of 700 to 3,000, as well as catalysts, blowing agents, emulsifiers, stabilizers and, if necessary, other conventional additives.

2. Description of the Prior Art

In the production of so-called highly resilient polyurethane foams, a polyisocyanate which is at least difunctional, for example, toluene diisocyanate or diphenylmethane diisocyanate, is reacted with a polyol, which has at least two hydroxyl groups per molecule and which, on the average, has a high proportion of primary hydroxyl groups. Such polyols are synthesized, as a rule, by first of all adding propylene oxide to a starter alcohol and then adding ethylene oxide to this product in amounts, such that at least 40% of the hydroxyl groups, and preferably 70 to 90% of the hydroxyl groups, are present in the form of primary hydroxyl groups.

Due to the high content of primary hydroxyl groups, the polyols have a high reactivity towards isocyanates. In contrast to conventional polyurethane foams, i.e., the so-called hot foams, a high crosslinking density is therefore achieved during foaming. This has the advantage that there is no need to supply external energy during curing and that the overall time required for curing the foams is reduced. It is, however, a disadvantage that the tendency to form closed-cell foams is increased and the processing latitude is restricted. The expression "processing latitude" is understood to be the tolerance limits within which it is possible to deviate from a formulation without endangering the formation of stable and, at the same time, open-celled foams.

The processing latitude which is narrower due to the high reactivity of the foaming components, which make it more difficult to form a stable, yet open-celled foam, do not permit those products which have been successfully employed in the production of so-called hot foams, to be used as foam stabilizers.

In the production of highly resilient, cold-curing polyurethane foams, it is in principle possible, as a result of the high reactivity of the foaming raw material, to obtain stable foams without the addition of foam stabilizers, by using higher functional isocyanates or polyethers, as well as low molecular, polyfunctional crosslinking agents. However, the foams which are obtained in this manner, have a coarser cell structure and are significantly closed-celled and therefore not usable industrially.

For the purpose of regulating the cell structure of these foams, it is possible to use low molecular methyl or phenylmethylpolysiloxanes, such as those described in German Pat. No. 25 33 074 and German Offenlegungsschrift No. 22 21 811. By so doing, sufficiently open-celled foams with a controlled cell structure are obtained in a narrow domain. However, the processing latitude is narrow and, what is even more important, the physical properties of these foams are not adequate for many applications. As a consequence of their high degree of crosslinking, these foams have low values for the elongation at rupture and resistance to tearing and, moreover, a relatively low hardness.

In order to eliminate these disadvantages, highly resilient foams have been developed which are prepared with reactive polyols, predominantly difunctional isocyanates, such as, pure toluene diisocyanate (TDI) or mixtures of TDI with 20% or less of diphenylmethane diisocyanate and slight amounts of crosslinking compounds as raw materials. Besides the polyols consisting of propylene and ethylene oxides, it is possible to use polyols which contain chemically bound or physically dispersed polymeric components, such as, for example, polymers of acrylonitrile and styrene or polymeric urea derivatives, in order to improve the hardness of these foams.

Formulations on this basis do not produce inherently stable foams. Thus, unless stabilizers are added, the foams collapse once again after they have risen. The stabilizers required for these foams must therefore have a stabilizing action against relapse, as well as a cell regulating action and must ensure the formation of open-celled foams over as wide a range as possible.

Compounds have already been proposed to meet these requirements. The stabilizers of the state of the art can be divided into two groups:

One group is formed by polysiloxane-polyoxyalkylene copolymers, in which the polysiloxane blocks have a molecular weight of about 150 to 2,500 and the polyoxyalkylene blocks a molecular weight of about 150 to 1,500. The products are free of hydroxyl groups. Such products and their use in polyurethane foaming are described in U.S. Pat. Nos. 3,741,917 and 4,031,044.

The other group of stabilizers comprises polysiloxanes which are modified with organic groups. Such groups are the cyanoalkyl group (U.S. Pat. No. 3,952,038), the cyanoalkoxyalkyl group (German Auslegeschrift No. 2 402 690, the sulfolanyloxyalkyl group (U.S. Pat. No. 4,110,272), the morpholinoalkoxyalkyl group (U.S. Pat. No. 4,067,828) and the tertiary hydroxyalkyl group (U.S. Pat. No. 4,039,490).

A disadvantage of the aforementioned and, in principle, usable stabilizers is their relatively narrow processing latitude. This forces the processor to adhere to very close tolerances in metering out the foaming components, which cannot always be done with the required reliability. Besides the principal requirements which a stabilizer must meet, that is stabilization against relapse, cell regulation and cell openness after rising, the main task of the stabilizer is to exert an equalizing function over the changes which occur in practice. It must be possible to adjust foam formulations of different reactivity and stability to the desired stabilizing level by changing the concentration of the stabilizer. For this reason, the processing latitude of a stabilizer with respect to changes in the concentration is of great practical importance. Higher and lower concentrations of a good stabilizer must stabilize the foam, as well as produce foams of comparable cell openness and cell structures.

It is evident from these requirements for a foam stabilizer that these products at times have to fulfill contradictory tasks. Particularly, on the one hand, the foam must be stabilized against sagging and, on the other, the opening of the cells after the foam has reached maximum height, should be as complete as possible. In view of the complex processes that take place when different polyurethane formulations are foamed, it is hardly possible to predict the structure and effectiveness of foam stabilizers and particularly, to apply the knowledge gained, for example, in the field of conventional hot foams, to other foam systems. It is therefore essential for each foam technology to empirically test possible variations in the structure of the stabilizer molecule. The discovery of a special variation can therefore represent a significant practical improvement.

SUMMARY OF THE INVENTION

We have discovered novel stabilizers for the production of highly resilient, cold-curing polyurethane foams. These stabilizers have improved stabilizing properties and, while having a relatively broad processing latitude, at the same time produce open-celled foams. This combination of properties was not to be found in the products of the state of the art.

More particularly, the stabilizers of the present invention are polysiloxanepolyoxyalkylene block copolymers having the following characteristics:

(a) the polysiloxane block is linear or branched and contains an average of 4 to 25 silicon atoms, wherein the organic radicals linked to the silicon atoms are polyoxyalkylene or methyl radicals and up to 30% of the methyl radicals can be replaced by substituted alkyl radicals with 1 to 4 carbon atoms and/or phenyl radicals;

(b) the polyoxyalkylene portion consists of at least two polyoxyalkylene blocks, $A_1$ and $A_2$, which are formed from oxyethylene and oxypropylene units, wherein block $A_1$ is formed from 45 to 100 mole percent of oxyethylene units and 55 to 0 mole percent of oxypropylene units and block $A_2$ is formed from 0 to 50 mole percent of oxyethylene units and 100 to 50 mole percent of oxypropylene units, the molecular weight of the polyoxyalkylene blocks $A_1$ and $A_2$ in each case being 150 to 1,200 and the molar ratio of blocks $A_1:A_2$ falling in the range of 20:80 to 80:20; and (c) the polysiloxane block is linked to the polyoxyalkylene blocks by SiOC or SiC bridges, 1.5 to 10 polyoxyalkylene blocks being linked to each polysiloxane block on the average.

DESCRIPTION OF THE PREFERRED EMBODIMENT

In accordance with a preferred modification of the inventive process, polysiloxane-polyoxyalkylene block copolymers of the general formula $$P(CH_3)_2SiO[Si(CH_3)_2O]_a(SiCH_3PO)_bSi(CH_3)_2P \quad \text{I}$$

are used, in which P represents a polyoxyalkylene radical $A_1$ or $A_2$ or a methyl radical, but at least 1.5 P radicals represent a polyoxyalkylene radical and $a=1$ to 25, and $b=0$ to 10.

Especially preferred are polysiloxane-polyoxyalkylene block copolymers in which the polyoxyalkylene radicals are either exclusively terminal or exclusively lateral. These preferred block copolymers can be represented by the general formulas II and III:

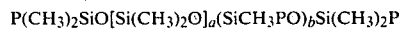

$$P(CH_3)_2SiO[Si(CH_3)_2O]_aSi(CH_3)_2P \quad \text{II}$$

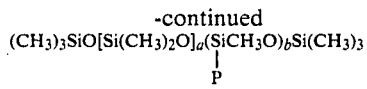

$$(CH_3)_3SiO[Si(CH_3)_2O]_a(SiCH_3O)_bSi(CH_3)_3 \quad \text{III}$$
$$\qquad\qquad\qquad\qquad\quad |$$
$$\qquad\qquad\qquad\qquad\quad P$$

in which $a=2$ to 23 in formula II and $a=0$ to 20 in formula III, $b=1.5$ to 10 and P represents the polyoxyalkylene blocks $A_1$ and $A_2$. The polyoxyalkylene blocks, $A_1$ and $A_2$ can be linked by SiC or SiOC groups to the polysiloxane blocks and consist predominantly of oxyethylene and oxypropylene units. Their composition can be represented by the following formula:

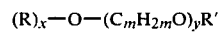

$$(R)_x-O-(C_mH_{2m}O)_yR'$$

in which R can be an alkylene group with 2 to 4 carbon atoms and $x=0$ or 1. R' is a hydrogen radical, an alkyl radical with 1 to 4 carbon atoms, a carboxyl radical or an alkylaryl radical.

For the polyoxyalkylene block $A_1$, the average value of m is 2.00 to 2.55 and $y=2$ to 24; for the polyoxyalkylene block $A_2$, the average value of m is 2.50 to 3.00 and $y=2$ to 20.

Preferably, the molar ratio of polyoxyalkylene blocks $A_1$ to polyoxyalkylene blocks $A_2$ lies in the range of $A_1:A_2 = 30:70$ to $70:30$.

The inventive polysiloxane-polyoxyalkylene block copolymers can be synthesized by known procedures. The SiOC-linked copolymers can be formed, for example, by reacting polysiloxanes having terminal functional groups X, such as, halogen, sulfate or alkyl sulfonate, with polyoxyalkylene polymers having terminal hydroxyl groups in the presence of an acid acceptor, such as, for example, ammonia or tertiary amines.

The SiC-linked copolymers are formed by reacting polysiloxanes, having terminal SiH groups and/or such groups in the polysiloxane chain, with polyoxyalkylenes having a terminal C=C double bond. Platinum catalysts in particular, such as, for example, $H_2PtCl_6O\cdot 6H_2O$ or cis-[Pt(NH$_3$)$_2$Cl$_2$] are suitable for accelerating this addition reaction.

It could not have been anticipated by those skilled in the art that the block copolymers which are to be used in the inventive process, would have the desired combination of properties. The desired improvements could not be achieved by varying the ethylene oxide/propylene oxide ratio in block copolymers, which have a homogeneous polyoxyalkylene portion nor by mixing block copolymers, each of which is uniform and, on the one hand, has the structure of blocks $A_1$ and, on the other, the composition of blocks $A_2$. The linking of two polyoxyalkylene blocks of different structure to one polysiloxane segment therefore surprisingly results in a clear improvement relative to the known stabilizers of the state of the art.

In order to further improve the cell regulation and the open-cell nature of the highly resilient foams, the organopolysiloxanes, which are to be used in the inventive process, may optionally be combined with alkyl or alkylarylpolysiloxanes of relatively short chain length. Preferred examples of polysiloxanes of this type are those which have defined chain lengths with 4 to 15 silicon atoms. In order to improve the miscibility of the polyol and isocyanate, the inventive organopolysiloxanes can be used in admixture with nonionic organic emulsifiers, such as, for example, ethoxylated alkylphenols or fatty alcohol ethoxylates.

Reaction components or additives which are known for and customarily used in the manufacture of highly resilient polyurethane foams, can be employed for the inventive process.

As the at least, difunctional polyisocyanates, the isomers of toluene diisocyanate, the isomers of diphenylmethane diisocyanate or oligomeric polyphenylmethylene isocyanates can be used.

The polyols have at least 2, and especially 2 to 8, hydroxyl groups per molecule of which, on the average, at least 40% and preferably 70 to 90%, are primary hydroxyl groups. The molecular weight per hydroxyl group (equivalent weight) is 700 to 3,000. The polyols may be built up exclusively of oxyethylene and oxypropylene units. Up to 30 weight percent of other polymeric components may be chemically bound or physically dispersed in the polyols. Such other polymeric components are, for example, polymers of styrene or acrylonitrile or copolymers thereof, as well as, for example, polymeric organic urea derivatives.

As catalysts, the conventional catalysts, such as, for example, organic salts of tin and tertiary amines are used.

Besides water, suitable blowing agents for this purpose are the chlorofluorohydrocarbons, which are known for this purpose. Further additives are flameproofing agents, such as, for example, chloroalkylphosphoric esters, as well as inert fillers and coloring pigments.

The superior properties of the stabilizers used in the inventive process in conventional foam formulations of the state of the art are shown in the following examples.

The polysiloxane-polyether copolymers, which are to be used in the inventive process, are synthesized by methods, the principles of which are known. The procedures described in Examples 1 to 10 and especially 1 to 5 are examples of the synthesis of these products.

EXAMPLE 1

This example shows the reaction of a polysiloxane having the average formula $X[(CH_3)_2SiO]_{4.8}Si(CH_3)_2X$ (I) (wherein X=Cl and $SO_{4/2}$, approximately 75% of the terminal groups are chlorine) with a polyether A (obtained by the addition reaction of 20 weight percent ethylene oxide and 80 weight percent propylene oxide with butylene glycol to a molecular weight of 515) and a polyether B (obtained by the addition reaction of 60 weight percent of ethylene oxide and 40 weight percent of propylene oxide with butylene glycol to a molecular weight of 530) to form an SiOC-linked polysiloxanepolyalkyleneoxide block copolymer.

Polyether A (113.3 g=0.22 moles) and polyether B (116.4 g=0.22 moles) in 800 ml of toluene were added to a flask which was equipped with a stirrer, thermometer, gas inlet and distillation head. Under an atmosphere of nitrogen, 150 ml of toluene were distilled over in order to azeotropically remove any water. The distillation head was now exchanged for a reflux condenser equipped with a drying tube. At 50° C., 98.3 g of siloxane I (=0.2 moles) were added to the flask and mixed briefly. Ammonia gas was now passed in with stirring until the mixture gave a positive reaction for ammonia. The mixture was then allowed to react for a further hour, the precipitated salt was filtered off and the toluene removed at 70° C. and approximately 20 mbar. An almost clear, yellowish product with a viscosity (20° C.) of 39.8 mPas was obtained.

EXAMPLES 2, 3 AND 4

The products given in Table 1 were synthesized by the method described in Example 1.

TABLE 1

| | Siloxane | | | Polyether | | | Viscosity (20° C.) |
|---|---|---|---|---|---|---|---|
| | | Amount Weighed out | | | Amount Weighed out | | |
| Example | Type | g | mole | Type | g | mole | mPas |
| 2 | I | 98.3 | 0.2 | A | 226.6 | 0.44 | 32.9 |
| 3 | I | 98.3 | 0.2 | B | 232.8 | 0.44 | 42.3 |
| 4 | I | 98.3 | 0.2 | C | 228.8 | 0.44 | 36.8 |

Polyether C was obtained by the addition reaction of ethylene and propylene oxides with butylene glycol and contained 60 weight percent of propylene oxide. The molecular weight was 520. Consequently, the composition of polyether C corresponded to the average composition of the polyether mixture of polyethers A and B which was used in Example 1.

The further examples show the reaction of SiH-containing siloxanes with allyl group-containing polyethers to form SiC-linked polysiloxane-polyoxyalkylene block copolymers.

EXAMPLE 5

Allyl polyether monool D (141.3 g=0.25 moles) (obtained by the addition reaction of ethylene and propylene oxides with allyl alcohol and having 80 weight percent of propylene oxide, 20 weight percent of ethylene oxide and an iodine number of 44.9), 132.5 g (=0.25 moles) of allyl polyether monool E (synthesized like D, however, with 40 weight percent of propylene oxide, and so as to have an iodine number of 47.9) and 450 ml toluene were added to a flask equipped with stirrer, thermometer, gas inlet and distillation head and dried azeotropically by distilling off approximately 150 ml of toluene. The drying and the later reaction were carried out under a blanket of nitrogen. After the drying, the flask was provided with a reflux condenser and 10 mg of cis-[Pt(NH$_3$)$_2$Cl$_2$] were added as catalyst at 115° C. Subsequently, 70 g (=0.1 mole) of a polysiloxane of the average formula $(CH_3)_3SiO[(CH_3)HSiO]_4[(CH_3)_2SiO]_4Si(CH_3)_3$ (II) were added dropwise over 30 minutes. The reaction was continued at 115° C. until only small amounts of the SiH could be determined. Thereafter, 4 g of bentonite were stirred in at 60° C. After one hour, the mixture was filtered and toluene was removed by distillation at 70° C. and 20 mbar. A clear, yellowish product with a viscosity (20° C.) of 219 mPas was obtained.

EXAMPLES 6, 7 AND 8

The products given in Table 2 were synthesized by the method described in Example 5.

TABLE 2

| | Siloxane | | | Polyether | | | Viscosity (20° C.) |
|---|---|---|---|---|---|---|---|
| | | Amount Weighed out | | | Amount Weighed out | | |
| Example | Type | g | mole | Type | g | mole | mPas |
| 6 | II | 70 | 0.1 | D | 282.6 | 0.5 | 191 |
| 7 | II | 70 | 0.1 | E | 265 | 0.5 | 225 |
| 8 | II | 70 | 0.1 | F | 276 | 0.5 | 203 |

Polyether F was obtained by the addition reaction of ethylene and propylene oxides with allyl alcohol and contained 60 weight percent of propylene oxide. The iodine number was 46. The composition of polyether F therefore corresponded to the average composition of the polyether mixture of polyethers D and E which was used in Example 5.

EXAMPLES 9 AND 10

The products given in Table 3 were synthesized by the method described in Example 5. However, the allyl polyethers used had terminal $OCH_3$ groups instead of terminal OH groups. The polyethers were synthesized by the addition reaction of ethylene and propylene oxides with allyl alcohol and subsequent methylation of the free hydroxyl group.

The following α-methoxy-ω-allylpolyethers were synthesized:

|  | Propylene Oxide Content (wt. %) | Iodine Number |
|---|---|---|
| Polyether G | 80 | 44.2 |
| Polyether H | 40 | 46.2 |
| Polyether J | 55 | 46.0 |

The polyethers were reacted with a polysiloxane of the following average composition:

$$(CH_3)_3SiO[(CH_3)HSiO]_{2.2}[(CH_3)_2SiO]_{1.8}Si(CH_3)_3 \qquad (III)$$

TABLE 3

| | Siloxane | | | Polyether | | |
|---|---|---|---|---|---|---|
| | | Amount Weighed out | | | Amount Weighed out | Viscosity (20° C.) |
| Example | Type | g | mole | Type | g | mole | mPas |
| 9 | III | 64.2 | 0.15 | G | 82.7 | 0.144 | 56.3 |
|   |     |      |      | H | 147.1 | 0.268 |      |
| 10 | III | 64.2 | 0.15 | J | 227.4 | 0.412 | 61.7 |

The ethylene oxide/propylene oxide content of polyether J corresponds to that of the mixture of polyethers G and H used in Example 9.

The foams in which the inventive organopolysiloxanes were used, were prepared and evaluated in formulations for molded and block foams in the following way:

FOAMING EXPERIMENTS

Molded Foams

With the exception of the isocyanate, the components listed in formulations 1 or 2 below were weighed into a 2 l beaker and mixed for 60 seconds at 500 rpm with a propeller stirrer. Appropriate amounts of isocyanate were then added and the mixture was stirred for a further 7 seconds at 2,000 rpm. The reaction mixture was then added to an aluminum mold with the dimensions of 40 cm×40 cm×10 cm, which had been preheated to 50° C. and treated with a release agent. The molding time for both formulations was 8 minutes.

Evaluation of the Molded Foams

The molded part was carefully taken from the mold for the determination of the impression force. Immediately afterwards, the indentation hardness was measured at 50% compression on that part of the foam which had not been pressed against. The round die used for this purpose had an area of 300 cm². After the pressure was released, the closed cells present in the foamed part were opened up completely by extensive fulling. The indentation hardness at 50% compression was then measured once again. The difference between the two values was taken to be a measure of the impression force.

In addition, the number of cells per cm were counted and the uniformity of the cell structure was evaluated.

Block Foams

Experimental Procedure

The experiments were carried out on a 2-component Admiral low pressure machine. The polyol output was 10 kg/min. The foaming process took place in a box with the dimensions of 100 cm×60 cm×60 cm which was open at the top.

Evaluation of the Block Foams

The intensity of the blowing off was evaluated in the block foams in order to assess the effect of various stabilizers at different concentrations. In addition, the impression force, the porosity of the foamed materials and their resilience after impression were measured. The number of cells per cm of block foam was counted and the uniformity of the cell structure was evaluated. The measurements were carried out as follows:

Evaluation of the Blowing Off

A differentiation was made between no, slight and good blowing off. If at the end of the rise reaction, the skin at the top opened up uniformly over the whole width of the foam, blowing off was described as being good.

Measurement of Resilience

The ASTM D 1564 Ball-Rebound Test was used.

Measurement of Porosity

The values given are the back pressure in mm of water which is required to maintain a constant flow of air of 6 l/min. through a piece of foam 10 cm thick and with sides of 30 cm×30 cm. Low values therefore show a higher open-celled nature.

Measurement of Impression Force

In order to carry out this measurement, foaming was carried out in a box with the dimensions of 25 cm×25 cm×25 cm, which was open at the top. After a 2-day storage in a normal atmosphere, the top of the packet was cut off at a height of 20 cm. The indentation compression hardness was measured on the untouched as well as on the thoroughly fulled foam. The difference between the forces determined in N is the force which is required to impress the cells. A square die with an area of 100 cm² was used to measure the indentation forces.

The values for impression force, porosity and resilience are closely related and represent a measure for the open-celled nature of the foams. Since the residue of the cell windows which remain after impression hinder the passage of air, originally closed foams still have inferior porosity and resilience values after being impressed.

Foaming Examples

The polysiloxane-polyoxyalkylene block copolymers which are to be used inventively, were checked in the following formulations for highly resilient polyurethane molded foams.

| Formulation 1 | |
|---|---|
| Desmophen ® 3973 | 60 parts by weight |
| Desmophen ® 3119 | 40 parts by weight |
| Water | 3.2 parts by weight |
| Triethylenediamine (33% in propylene glycol) | 0.4 parts by weight |
| Bis(dimethylaminoethylether) (70% in dipropylene glycol) | 0.3 parts by weight |
| Tin dibutyl laurate | 0.01 parts by weight |
| Stabilizer | variable |
| TDI 80/MDI = 80/20 | 39.2 parts by weight |

Desmophen ®3973 is a polyol of the Bayer AG Company which is built up exclusively from propylene and ethylene oxides and has more than 70% primary hydroxyl groups and an average molecular weight of 6,000.

Desmophen ®3119 is a polyol of the Bayer AG Company, which contains polymeric urea segments and has 70–80% primary hydroxyl groups and an average molecular weight of 6,000.

TDI 80 is a mixture of the 2,4 and 2,6 isomers of toluene diisocyanate in the ratio of 80:20. An oligomeric polyphenylmethylene isocyanate of the Bayer Company (Desmodur ®44 020) was used as MDI.

The molded foams of this formulation have a relative density of approximately 34 kg/cm$^3$.

| Formulation 2 | |
|---|---|
| Voranol ® CP 4711 | 60 parts by weight |
| Niax ® Polyol 34 - 28 | 40 parts by weight |
| Water | 3.7 parts by weight |
| Diethanolamine | 0.6 parts by weight |
| Triethylenediamine (33% in propylene glycol) | 0.4 parts by weight |
| Bis(dimethylaminoethyl)ether (70% in dipropylene glycol) | 0.12 parts by weight |
| Tin dibutyl laurate | 0.02 parts by weight |
| Stabilizer | variable |
| TDI 80 | 42.3 parts by weight |

Voranol ®CP 4711 is a polyol of the Dow Chemical Company which is built up exclusively from propylene and ethylene oxides and has approximately 70% primary hydroxyl groups and an average molecular weight of 4,800.

Niax ®Polyol 34-28 is a polyol of the Union Carbide Company which contains portions of a polymeric acrylonitrile/styrene and has predominantly primary hydroxyl groups and a hydroxyl number of 28.

The molded foams formed with this formulation have a relative density of approximately 29 kg/m$^3$.

The following mixtures were used as stabilizers:

(A) 10 weight percent of a polysiloxane-polyoxyalkylene block copolymer, dissolved in 90 weight percent of a polyether of a molecular weight of 1,000 and a weight ratio of ethylene oxide to propylene oxide of 42:58;

(B) 10 weight percent of a polysiloxane-polyoxyalkylene block copolymer, mixed with 85 weight percent of the same polyether as in (A) and 5 weight percent of a polydimethylsiloxane fraction of a chain length N=5 to 9;

(C) 10 weight percent of a polysiloxane-polyoxyalkylene block copolymer, mixed with 86 weight percent of the same polyether as in (A) and 4 weight percent of a polydimethylsiloxane fraction of a chain length N=8 to 13.

The block copolymers of Examples 1, 5 and 9 were used inventively as polysiloxane-polyoxyalkylene block copolymers in stabilizer mixtures A, B and C, the block copolymers of Examples 2, 3, and 4, as well as 6, 7, 8 and 10 were used for comparison.

The following results were obtained with Foam Formulation 1.

| Copolymer of Example | Parts by Weight of Stabilizer Mixture | Impression Force | Cells/cm | Cell Structure |
|---|---|---|---|---|
| Stabilizer Mixture A: | | | | |
| 1 | 0.8 | 300 | 11 | uniform |
|   | 1.5 | 450 | 12 | uniform |
| 2 | 0.8 | 500 | 13 | uniform |
|   | 1.5 | 800 | 14 | uniform |
| 3 | 0.8 | 360 | 8 | defective |
|   | 1.5 | 600 | 9 | still defective |
| 4 | 0.8 | 480 | 11 | still defective |
|   | 1.5 | 670 | 12 | uniform |
| Stabilizer Mixture B: | | | | |
| 1 | 0.8 | 180 | 12 | uniform |
|   | 1.5 | 200 | 12 | uniform |
| 2 | 0.8 | 700 | 14 | uniform |
|   | 1.5 | 900 | 15 | uniform |
| 3 | 0.8 | 400 | 10 | uniform |
|   | 1.5 | 500 | 10 | uniform |
| 4 | 0.8 | 350 | 13 | uniform |
|   | 1.5 | 450 | 14 | uniform |
| Stabilizer Mixture A: | | | | |
| 5 | 0.8 | 250 | 12 | uniform |
|   | 1.5 | 400 | 12 | uniform |
| 6 | 0.8 | 400 | 14 | uniform |
|   | 1.5 | 620 | 14 | uniform |
| 7 | 0.8 | 380 | 8 | defective |
|   | 1.5 | 700 | 9 | still defective |
| 8 | 0.8 | 390 | 11 | still defective |
|   | 1.5 | 650 | 12 | still defective |
| Stabilizer Mixture C: | | | | |
| 5 | 0.8 | 150 | 12 | uniform |
|   | 1.5 | 190 | 12 | uniform |
| 6 | 0.8 | 280 | 13 | uniform |
|   | 1.5 | 380 | 13 | uniform |
| 7 | 0.8 | 320 | 10 | still defective |
|   | 1.5 | 400 | 10 | uniform |
| 8 | 0.8 | 220 | 11 | still defective |
|   | 1.5 | 290 | 12 | uniform |

The following results were obtained with Foam Formulation 2.

| Copolymer of Example | Parts by Weight of Stabilizer Mixture | Impression Force | Cell Structure |
|---|---|---|---|
| Stabilizer Mixture A: | | | |
| 1 | 1.0 | 200 | uniform |
|   | 1.8 | 280 | uniform |
| 2 | 1.0 | 280 | uniform |
|   | 1.8 | 370 | uniform |
| 3 | 1.0 | 310 | defective |
|   | 1.8 | 430 | still defective |
| 4 | 1.0 | 240 | still defective |
|   | 1.8 | 360 | uniform |
| Stabilizer Mixture B: | | | |
| 1 | 0.8 | 120 | uniform |
|   | 1.5 | 190 | uniform |
| 2 | 0.8 | 200 | uniform |
|   | 1.5 | 340 | uniform |
| 3 | 0.8 | 260 | still defective |
|   | 1.5 | 400 | uniform |
| 4 | 0.8 | 200 | uniform |
|   | 1.5 | 290 | uniform |
| Stabilizer Mixture A: | | | |
| 5 | 1.0 | 240 | uniform |
|   | 1.8 | 300 | uniform |
| 6 | 1.0 | 320 | still defective |
|   | 1.8 | 480 | uniform |
| 7 | 1.0 | 300 | defective |
|   | 1.8 | 450 | still defective |
| 8 | 1.0 | 300 | still defective |
|   | 1.8 | 460 | uniform |

-continued

| | Stabilizer Mixture C: | | |
|---|---|---|---|
| 5 | 0.8 | 110 | uniform |
| | 1.5 | 150 | uniform |
| 6 | 0.8 | 180 | uniform |
| | 1.5 | 280 | uniform |
| 7 | 0.8 | 220 | still defective |
| | 1.5 | 400 | uniform |
| 8 | 0.8 | 160 | uniform |
| | 1.5 | 270 | uniform |
| | Stabilizer Mixture A: | | |
| 9 | 1.0 | 260 | uniform |
| | 1.8 | 300 | uniform |
| 10 | 1.0 | 330 | still defective |
| | 1.8 | 450 | uniform |

The foaming results obtained with these two formulations for highly resilient polyurethane foams make it clear that in pure form, as well as in admixture with polydimethylsiloxanes, the block copolymers which are to be used inventively, have a higher activity with respect to cell regulation and, as illustrated by the values for the impression force, also a noticeably wider processing latitude with respect to changes in the concentration of the stabilizer.

The polysiloxane-polyoxyalkylene block copolymers, which are to be used inventively, were furthermore tested in the following Formulations 3 and 4 for highly resilient polyurethane block foams.

| Formulation 3: | |
|---|---|
| Desmophen ® 3900 | 75 parts by weight |
| Desmophen ® 3119 | 25 parts by weight |
| Water | 3.5 parts by weight |
| Diethanolamine | 0.9 parts by weight |
| Triethylenediamine (33% in propylene glycol) | 0.4 parts by weight |
| Dimethylethanolamine | 0.3 parts by weight |
| Trichloroethylphosphate | 2.0 parts by weight |
| TDI 80 | 41.3 parts by weight |

Desmophen ®3900 is a polyol of the Bayer AG Company which is built up exclusively from propylene and ethylene oxides and has approximately 70% primary hydroxyl groups and an average molecular weight of 4,800.

| Formulation 4: | |
|---|---|
| Desmophen ® 3900 | 75 parts by weight |
| Desmophen ® 3119 | 25 parts by weight |
| Water | 2.0 parts by weight |
| Diethanolamine | 0.6 parts by weight |
| Triethylenediamine (33% in propylene glycol) | 0.2 parts by weight |
| Bis(dimethylaminoethyl)ether (70% in dipropylene glycol) | 0.12 parts by weight |
| Tin dibutyl laurate | 0.15 parts by weight |
| TDI 80 | 28.6 parts by weight |

The foams of Formulation 3 had relative densities between 26 and 28 kg/cm³; those of Formulation 4 had relative densities ranging from 42 to 45 kg/m³.

The polysiloxane-polyoxyalkylene block copolymers which are to be used inventively were checked in Formulations 3 and 4 using Stabilizer Mixture C.

| Copolymer from Example | Parts by Weight of Stabilizer Mixture | Impression Force | Porosity | Resilience | Blowing Off |
|---|---|---|---|---|---|
| | | Formulation 3: | | | |
| 1 | 0.8 | 45 | 8 | 64 | good |
| | 1.5 | 70 | 12 | 66 | good |
| 2 | 0.8 | 65 | 20 | 62 | slight |
| | 1.5 | 94 | 33 | 64 | slight |
| 3 | 0.8 | 80 | 45 | 61 | slight |
| | 1.5 | 120 | 70 | 63 | none |
| 4 | 0.8 | 58 | 19 | 64 | slight |
| | 1.5 | 90 | 34 | 64 | good |
| 5 | 0.8 | 42 | 12 | 65 | good |
| | 1.5 | 68 | 17 | 66 | good |
| 6 | 0.8 | 63 | 18 | 64 | slight |
| | 1.5 | 89 | 29 | 63 | slight |
| 7 | 0.8 | 78 | 32 | 62 | slight |
| | 1.5 | 123 | 48 | 62 | none |
| 8 | 0.8 | 56 | 20 | 63 | slight |
| | 1.5 | 84 | 29 | 64 | slight |
| 9 | 0.8 | 51 | 17 | 65 | slight |
| | 1.5 | 72 | 32 | 65 | good |
| 10 | 0.8 | 69 | 31 | 64 | slight |
| | 1.5 | 92 | 43 | 63 | slight |
| | | Formulation 4: | | | |
| 1 | 0.6 | 22 | 6 | 65 | good |
| | 1.2 | 34 | 8 | 66 | good |
| 2 | 0.6 | 42 | 14 | 64 | slight |
| | 1.2 | 68 | 18 | 64 | good |
| 3 | 0.6 | 55 | 24 | 63 | slight |
| | 1.2 | 90 | 37 | 61 | slight |
| 4 | 0.6 | 37 | 12 | 64 | slight |
| | 1.2 | 59 | 22 | 63 | good |
| 5 | 0.6 | 27 | 7 | 66 | good |
| | 1.2 | 38 | 9 | 66 | good |
| 6 | 0.6 | 44 | 14 | 64 | slight |
| | 1.2 | 70 | 21 | 63 | slight |
| 7 | 0.6 | 54 | 27 | 62 | slight |
| | 1.2 | 84 | 45 | 62 | none |
| 8 | 0.6 | 39 | 14 | 64 | slight |
| | 1.2 | 66 | 24 | 64 | slight |
| 9 | 0.6 | 42 | 12 | 64 | good |
| | 1.2 | 63 | 14 | 65 | slight |
| 10 | 0.6 | 58 | 27 | 62 | slight |
| | 1.2 | 82 | 42 | 63 | none |

Compared to the products of the state of the art, the inventive polysiloxane-polyoxyalkylene block copolymers give clearly lower impression forces and better porosities. In addition, they lead to better blowing off after rising, which is an additional measure of the completeness of cell opening. With all products, the cell structure was adequately uniform.

We claim:

1. In a process for the manufacture of highly resilient, cold-curing polyurethane foams wherein polyisocyanates which are at least difunctional are reacted with polyols having at least two hydroxyl groups per molecule, of which at least 40% on the average are primary hydroxyl groups, the polyols having an equivalent weight per hydroxyl group of 700 to 3,000, in the presence of catalysts, blowing agents, emulsifiers, and foam stabilizers, the improvement which comprises using as the foam stabilizer, polysiloxane-polyoxyalkylene block copolymers wherein
   (a) the polysiloxane block is linear or branched and contains an average of 4 to 25 silicon atoms, wherein the organic radicals linked to the silicon atoms are polyoxyalkylene or methyl radicals and up to 30% of the methyl radicals can be replaced by radicals selected from the group consisting of substituted alkyl radicals with 1 to 4 carbon atoms, phenyl radicals, and mixtures thereof;

(b) the polyoxyalkylene portion consists of at least two polyoxyalkylene blocks, $A_1$ and $A_2$, which are formed from oxyethylene and oxypropylene units, wherein block $A_1$ is formed from 45 to 100 mole percent of oxyethylene units and 55 to 0 mole percent of oxypropylene units and block $A_2$ is formed from 0 to 50 mole percent of oxyethylene units and 100 to 50 mole percent of oxypropylene units, the molecular weight of the polyoxyalkylene blocks $A_1$ and $A_2$ in each case being 150 to 1,200 and the molar ratio of blocks $A_1:A_2$ falling in the range of 20:80 to 80:20, and (c) the polysiloxane block is linked to the polyoxyalkylene blocks by SiOC or SiC bridges, 1.5 to 10 polyoxyalkylene blocks being linked to each polysiloxane block on the average.

2. The process of claim 1 wherein the polysiloxane block is linear and contains an average of 4 to 15 silicon atoms.

3. The process of claim 1 wherein the molecular weight of the polyoxyalkylene blocks $A_1$ and $A_2$ is 300 to 1,000 in each case.

4. The process of claim 2 wherein the molecular weight of the polyoxyalkylene blocks $A_1$ and $A_2$ is 300 to 1,000 in each case.

5. The process of claim 1 wherein an average of 2 to 6 polyoxyalkylene blocks are linked to each polysiloxane block.

6. The process of claim 2 wherein an average of 2 to 6 polyoxyalkylene blocks are linked to each polysiloxane block.

7. The process of claim 3 wherein an average of 2 to 6 polyoxyalkylene blocks are linked to each polysiloxane block.

8. The process of claim 4 wherein an average of 2 to 6 polyoxyalkylene blocks are linked to each polysiloxane block.

9. A highly resilient, cold-curing polyurethane foam produced by the process of claim 1.

10. A highly resilient, cold-curing polyurethane foam produced by the process of claim 2.

11. A highly resilient, cold-curing polyurethane foam produced by the process of claim 3.

12. A highly resilient, cold-curing polyurethane foam produced by the process of claim 4.

13. A highly resilient, cold-curing polyurethane foam produced by the process of claim 5.

14. A highly resilient, cold-curing polyurethane foam produced by the process of claim 6.

15. A highly resilient, cold-curing polyurethane foam produced by the process of claim 7.

16. A highly resilient, cold-curing polyurethane foam produced by the process of claim 8.

* * * * *